(12) United States Patent
Azechi et al.

(10) Patent No.: US 7,153,583 B2
(45) Date of Patent: Dec. 26, 2006

(54) LIQUID SILICONE RUBBER COATING COMPOSITION AND AIRBAG

(75) Inventors: Syuuichi Azechi, Gunma-ken (JP); Hidenori Mizushima, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/839,377

(22) Filed: May 6, 2004

(65) Prior Publication Data

US 2004/0222618 A1      Nov. 11, 2004

(30) Foreign Application Priority Data

May 7, 2003   (JP) ............................ 2003-128648
Jul. 24, 2003  (JP) ............................ 2003-200963

(51) Int. Cl.
*B32B 9/04* (2006.01)

(52) U.S. Cl. .................. 428/447; 524/493; 524/588; 525/478; 525/479; 528/24; 528/31; 528/32; 528/15

(58) Field of Classification Search ............... 528/15, 528/24, 31, 32; 524/492; 428/447; 442/164
See application file for complete search history.

(56) References Cited

U.S. PATENT DOCUMENTS

| | | | | |
|---|---|---|---|---|
| 4,929,669 A | * | 5/1990 | Jensen ....................... 524/861 |
| 5,208,097 A | | 5/1993 | Honma et al. |
| 5,258,211 A | | 11/1993 | Momii et al. |
| 5,482,978 A | * | 1/1996 | Takahashi et al. ............. 521/82 |
| 5,529,837 A | | 6/1996 | Fujiki et al. |
| 5,595,826 A | * | 1/1997 | Gray et al. ................. 428/450 |
| 5,863,625 A | * | 1/1999 | Chiou ........................ 428/36.1 |
| 5,877,256 A | | 3/1999 | Nakamura et al. |
| 5,919,884 A | * | 7/1999 | Fink et al. ..................... 528/15 |
| 5,989,719 A | * | 11/1999 | Loiselle ...................... 428/447 |
| 6,268,300 B1 | | 7/2001 | Hernandez et al. |
| 6,586,551 B1 | | 7/2003 | Bohin et al. |
| 2003/0104226 A1 | * | 6/2003 | Yaginuma et al. .......... 428/447 |
| 2003/0166739 A1 | * | 9/2003 | Kimura ...................... 522/172 |
| 2005/0020740 A1 | * | 1/2005 | Matsunaga et al. ......... 524/261 |

FOREIGN PATENT DOCUMENTS

| | | |
|---|---|---|
| EP | 0663468 A1 | 7/1995 |
| JP | 02-158442 A | 6/1990 |
| JP | 05-025435 A | 2/1993 |
| JP | 05-179203 A | 7/1993 |
| JP | 05-214295 A | 8/1993 |
| JP | 06-041874 A | 2/1994 |
| JP | 07-070923 A | 3/1995 |
| JP | 07-195990 A | 8/1995 |
| JP | 07-300774 A | 11/1995 |
| JP | 2000-191915 A | 7/2000 |
| JP | 2002-508369 A | 7/2000 |
| JP | 2002-138249 A | 5/2002 |
| WO | WO 03/057777 | * 7/2003 |

* cited by examiner

*Primary Examiner*—Marc S. Zimmer
(74) *Attorney, Agent, or Firm*—Birch, Stewart, Kolasch & Birch, LLP

(57) ABSTRACT

Liquid silicone rubber coating compositions which include specific amounts of an organopolysiloxane bearing at least two alkenyl groups, an organohydrogenpolysiloxane bearing at least two silicon-bonded hydrogen atoms, a crosslinking reaction catalyst which is an organic peroxide, a finely divided silica and a tackifier have a good coatability even when not diluted with a solvent. In airbags obtained by coating such a composition onto a woven base fabric and curing the applied composition, the cured coat does not delaminate during airbag inflation, thus minimizing inflator gas leakage and resulting in excellent inflation time sustainability.

11 Claims, No Drawings

LIQUID SILICONE RUBBER COATING COMPOSITION AND AIRBAG

This Non-provisional application claims priority under 35 U.S.C. § 119(a) on Patent Application No(s). 2003-128648 & 2003-200963 filed in Japan on May 7, 2003 & Jul. 24, 2003; respectively, the entire contents of which are hereby incorporated by reference.

TECHNICAL FIELD

The present invention relates to a coating material having adhesive properties. More particularly, the invention relates to a liquid silicone rubber coating composition which can be used on textile fabric without requiring dissolution in an organic solvent and which is especially suitable for airbag applications wherein either the composition is coated onto a plain-weave base fabric and the coated fabric is subsequently shaped into a bag or the composition is coated onto a bag that has been formed by weaving. The invention also relates to an airbag having a rubber coat made from such a composition.

BACKGROUND ART

A variety of silicone rubbers are in use recently as coating materials for textile fabric. Specific applications include decorative uses such as patches and stickers, apparel-related uses such as for preventing slippage in trousers and men's wear, and airbags used in transportation vehicles such as automobiles.

Some airbags are made by bonding together with an adhesive the outer peripheral edges of two sheets of plain-woven base fabric, each of which has been rubber-coated on the inside surface, and stitching the edges together through the adhesive layer. Such airbags are referred to herein as "plain-weave airbags."

JP-A 2-158442 discloses an airbag in which the bag is formed by weaving and does not require bonding with an adhesive. Airbags of this type are referred to herein as "hollow-weave airbags." Hollow-weave airbags have excellent compactibility, but are known to have one important drawback. Specifically, the coat in a hollow-weave airbag is provided on the outside surface of the airbag. During inflation, the inflator gas thus presses against the airbag from the base fabric side, which differs significantly from plain-weave airbags in which the gas presses against the airbag from the rubber coated side. As a result, when the desire has been to sustain a certain airbag inflation time, rubber coatings used in prior-art plain-weave airbags have proven to be ineffective for sustaining inflation for the same length of time in hollow-weave airbags. Accordingly, there exists a desire for coating materials which are suitable for use in hollow-weave airbags.

Silicone coatings have already been disclosed in, for example, JP-A 5-25435, JP-A 5-179203 corresponding to U.S. Pat. No. 5,258,211, JP-A 6-41874 corresponding to U.S. Pat. No. 5,208,097, JP-A 7-70923, JP-A 7-195990 corresponding to EP 663,468 and JP-A 7-300774 corresponding to U.S. Pat. No. 5,529,837. Liquid silicone coatings have been disclosed in, for example, JP-A 5-214295 corresponding to U.S. Pat. No. 5,877,256, JP-A 2000-191915 corresponding to U.S. Pat. No. 6,268,300, JP-A 2002-138249 and JP 3349516 corresponding to U.S. Pat. No. 6,586,551.

These coatings are either of a type that is dissolved in an organic solvent to lower the viscosity then applied to a substrate, or of a type which, although in an easy-to-coat liquid form, makes use of a hydrosilylation reaction. Silicone rubber coatings that utilize an organic peroxide reaction are predominantly in the form of an uncured rubber. Solvent-free liquid silicone rubber coatings that are cured by means of an organic peroxide reaction in the liquid state have not been previously reported in the literature.

SUMMARY OF THE INVENTION

It is therefore one object of the invention to provide a liquid silicone rubber coating composition which can be coated onto fabric without using a solvent, which has in its cured form an excellent adhesion to the fabric and an excellent rubber strength, and which is suitable for use in airbags having excellent inflation time sustainability, particularly airbags in which the bag is formed by weaving. Another object of the invention is to provide airbags having a rubber coat made of such a composition.

I have discovered that liquid silicone rubber coating compositions which include (A) an organopolysiloxane having on the molecule an average of at least two alkenyl groups, (B) an organohydrogenpolysiloxane having on the molecule at least two silicon-bonded hydrogen atoms, (C) a crosslinking reaction catalyst which is an organic peroxide or a combination of an organic peroxide and an addition reaction catalyst, (D) a finely divided silica with a specific surface area of at least 50 $m^2/g$ as measured by the BET method and (E) a tackifier have certain characteristics that are highly desirable in airbag applications. Specifically, they are capable of forming silicone rubbers having an excellent tear strength and adhesion. Moreover, when such compositions are used to form the rubber coat on an airbag, and particularly a hollow-weave airbag, they minimize inflator gas leakage and thus have an excellent inflation time sustainability.

Specifically, I have found that the above liquid silicone rubber coating compositions which are rubber crosslinked by curing with a organic peroxide, or by a combination of organic peroxide curing and addition reaction curing, can be coated onto fabric without the use of a solvent, and that the cured form of such compositions has an excellent adhesion to fabric and an excellent rubber strength. These qualities enable such compositions to be effectively used in airbags, particularly airbags in which the bag is formed by weaving.

Accordingly, the invention provides a liquid silicone rubber coating composition which includes (A) 100 parts by weight of an organopolysiloxane having on the molecule an average of at least two alkenyl groups, (B) 0.1 to 50 parts by weight of an organohydrogenpolysiloxane having on the molecule at least two silicon-bonded hydrogen atoms, (C) a catalytic amount of a crosslinking reaction catalyst which includes an organic peroxide, (D) 0 to 50 parts by weight of a finely divided silica having a specific surface area, as measured by the BET method, of at least 50 $m^2/g$, and (E) 0.1 to 10 parts by weight of a tackifier. The crosslinking reaction catalyst may be a combination of an organic peroxide and an addition reaction catalyst.

The invention also provides airbags having a rubber coat made from the foregoing coating composition. The invention further provides airbags composed of a bag formed by weaving, and a rubber coat which covers the woven bag and is made from the foregoing coating composition.

The liquid silicone rubber coating compositions of the invention have a good coatability even when not diluted with a solvent. Moreover, because silicone rubber coats obtained from the inventive compositions do not peel, hollow-weave airbags having such a silicone rubber coat can be obtained in which inflator gas leakage is minimized, providing an excellent inflation time sustainability.

DETAILED DESCRIPTION OF THE INVENTION

The liquid silicone rubber coating composition of the invention includes the following components:
(A) an organopolysiloxane having on the molecule an average of at least two alkenyl groups,
(B) an organohydrogenpolysiloxane having on the molecule at least two silicon-bonded hydrogen atoms,
(C) a crosslinking reaction catalyst which includes an organic peroxide, and may be a combination of an organic peroxide with an addition reaction catalyst,
(D) a finely divided silica having a specific surface area of at least 50 $m^2/g$ as measured by the BET method, and
(E) a tackifier.

The primary component of the inventive coating compositions is component A, which is an organopolysiloxane having on the molecule an average of at least two alkenyl groups bonded to silicon atoms. Illustrative examples of the alkenyl groups in component A include ordinary alkenyl groups having about 2 to 8 carbons, and preferably about 2 to 4 carbons, such as vinyl, allyl, butenyl, pentenyl, hexenyl and heptenyl. Vinyl groups are especially preferred.

Bonding positions for the silicon-bonded alkenyl groups in component A include the ends of the molecular chain and/or side chains on the molecular chain. Organo groups other than alkenyl groups which may be bonded to silicon atoms on component A include unsubstituted or halogen-substituted monovalent hydrocarbon groups having generally about 1 to 12 carbons, and preferably about 1 to 10 carbons. Specific examples include alkyl groups such as methyl, ethyl, propyl, butyl, pentyl, hexyl, cyclohexyl and heptyl; aryl groups such as phenyl, tolyl, xylyl and naphthyl; aralkyl groups such as benzyl and phenethyl; and halogenated alkyl groups such as chloromethyl, 3-chloropropyl and 3,3,3-trifluoropropyl. Methyl and phenyl are especially preferred.

The content of alkenyl groups in component A is generally about 0.001 to 10 mol %, and preferably about 0.01 to 5 mol %, based on all the monovalent organic groups (substituted or unsubstituted monovalent hydrocarbon groups) bonded to silicon atoms.

Component A may have a molecular structure which is, for example, linear, linear with some branching, cyclic, or branched cyclic. A linear diorganopolysiloxane in which the main chain is basically composed of repeating diorganosiloxane units and both ends of the molecular chain are capped with triorganosiloxy groups is preferred. Here, "organo" may refer also to alkenyl groups.

To be able to obtain from the coating composition a silicone rubber having good physical properties and to make the composition easy to handle and work with, it is desirable for component A to have a viscosity at 25° C. within a range of preferably 100 to 500,000 mPa·s, and most preferably 300 to 100,000 mPa·s.

Illustrative examples of such organopolysiloxanes that may be used as component A include dimethylsiloxane-methylvinylsiloxane copolymers capped at both ends of the molecular chain with trimethylsiloxy groups, methylvinylpolysiloxanes capped at both ends of the molecular chain with trimethylsiloxy groups, dimethylsiloxane-methylvinylsiloxane-methylphenylsiloxane copolymers capped at both ends of the molecular chain with trimethylsiloxy groups, dimethylpolysiloxanes capped at both ends of the molecular chain with dimethylvinylsiloxy groups, methylvinylpolysiloxanes capped at both ends of the molecular chain with dimethylvinylsiloxy groups, dimethylsiloxane-methylvinylsiloxane copolymers capped at both ends of the molecular chain with dimethylvinylsiloxy groups, dimethylsiloxane-methylvinylsiloxane-methylphenylsiloxane copolymers capped at both ends of the molecular chain with dimethylvinylsiloxy groups, dimethylpolysiloxanes capped at both ends of the molecular chain with divinylmethylsiloxy groups, dimethylsiloxane-methylvinylsiloxane copolymers capped at both ends of the molecular chain with divinylmethylsiloxy groups, dimethylpolysiloxanes capped at both ends of the molecular chain with trivinylsiloxy groups, dimethylsiloxane-methylvinylsiloxane copolymers capped at both ends of the molecular chain with trivinylsiloxy groups, organosiloxane copolymers composed of siloxane units of the formula $R^1_3SiO_{0.5}$, siloxane units of the formula $R^1_2R^2SiO_{0.5}$, siloxane units of the formula $R^1_2SiO$ and a small amount of siloxane units of the formula $SiO_2$, organosiloxane copolymers composed of siloxane units of the formula $R^1_3SiO_{0.5}$, siloxane units of the formula $R^1_2R^2SiO_{0.5}$, and siloxane units of the formula $SiO_2$, organosiloxane copolymers composed of siloxane units of the formula $R^1_2R^2SiO_{0.5}$, siloxane units of the formula $R^1_2SiO$ and a small amount of siloxane units of the formula $SiO_2$, organosiloxane copolymers composed of siloxane units of the formula $R^1R^2SiO$ and a small amount of siloxane units of the formula $R^1SiO_{1.5}$ or siloxane units of the formula $R^2SiO_{1.5}$, and mixtures of two or more of these organopolysiloxanes.

In the above formulas, $R^1$ is a substituted or unsubstituted monovalent hydrocarbon group other than an alkenyl. Specific examples include alkyls such as methyl, ethyl, propyl, butyl, pentyl, hexyl, cyclohexyl and heptyl; aryls such as phenyl, tolyl, xylyl and naphthyl; aralkyls such as benzyl and phenethyl; and halogenated alkyls such as chloromethyl, 3-chloropropyl and 3,3,3-trifluoropropyl. $R^2$ is an alkenyl group, specific examples of which include vinyl, allyl, butenyl, pentenyl, hexenyl and heptenyl.

In particular, the organopolysiloxane serving as component A is preferably a combination of a diorganopolysiloxane which is capped at both ends of the molecular chain with alkenyldiorganosiloxy groups, dialkenylorganosiloxy groups or trialkenylsiloxy groups and has no alkenyl groups on the main chain (e.g., dimethylpolysiloxanes capped at both ends of the molecular chain with dimethylvinylsiloxy groups, dimethylpolysiloxanes capped at both ends of the molecular chain with divinylmethylsiloxy groups, and dimethylpolysiloxanes capped at both ends of the molecular chain with trivinylsiloxy groups), with a diorganosiloxane-alkenylorganosiloxane copolymer capped at both ends of the molecular chain with trialkenylsiloxy groups, dialkenylorganosiloxy groups, alkenyldiorganosiloxy groups or triorganosiloxy groups (e.g., dimethylsiloxane-vinylmethylsiloxane copolymers capped at both ends of the molecular chain with trivinylsiloxy groups, dimethylsiloxane-vinylmethylsiloxane copolymers capped at both ends of the molecular chain with divinylmethylsiloxy groups, dimethylsiloxane-vinylmethylsiloxane copolymers capped at both ends of the molecular chain with dimethylvinylsiloxy groups, and dimethylsiloxane-vinylmethylsiloxane copolymers capped at both ends of the molecular chain with trimethylsiloxy groups). Here, "organo" refers to the same substituted or unsubstituted alkyl, aryl or aralkyl groups as mentioned above with reference to $R^1$, but not to alkenyl.

Moreover, it is desirable for component A to include at least 1 wt % (i.e., 1 to 100 wt %), preferably 1 to 90 wt %, more preferably 10 to 80 wt %, even more preferably 30 to 80 wt %, and most preferably 40 to 75 wt %, of one or more selected from among diorganopolysiloxanes capped at both ends of the molecular chain with trialkenylsiloxy groups (e.g., dimethylpolysiloxane capped at both ends of the molecular chain with trivinylsiloxy groups), diorganosiloxane-alkenylorganosiloxane copolymers capped at both ends of the molecular chain with trialkenylsiloxy groups (e.g., dimethylsiloxane-methylvinylsiloxane copolymers capped at both ends of the molecular chain with trivinylsiloxy groups), diorganopolysiloxanes capped at both ends of the molecular chain with dialkenylorganosiloxy groups (e.g., dimethylpolysiloxanes capped at both ends of the molecular chain with divinylmethylsiloxy groups), and diorganosiloxane-alkenylorganosiloxane copolymers capped at both ends of the molecular chain with dialkenylorganosiloxy groups (e.g., dimethylsiloxane-methylvinylsiloxane copolymers capped at both ends of the molecular chain with divinylsiloxy groups). If component A includes too little of such polysiloxanes, the cured silicone rubber obtained from the coating composition may have rubber properties that fall short of what is desired.

Component B in the inventive coating compositions is an organohydrogenpolysiloxane which reacts with component A and enhances the adhesive properties, and which also plays a role in organic peroxide curing. In cases where an addition reaction catalyst is used as a crosslinking reaction catalyst, component B reacts with component A in the addition curing reaction, functioning as a crosslinking agent. Moreover, it also has an effect on adhesion. The molecular structure of component B is not subject to any particular limitation. Any of various organohydrogenpolysiloxanes synthesized in the prior art and having, for example, a linear, cyclic, branched or three-dimensional network structure (resinous) may be used. Component B has on the molecule at least two, and preferably at least three, silicon-bonded hydrogen atoms (hydrosilyl groups represented by the formula SiH). It is generally desirable for component B to have about 2 to 500, preferably about 3 to 200, and most preferably about 3 to 100, SiH groups. Organohydrogenpolysiloxanes having the following average compositional formula (1) may be used as component B:

$$R^3_b H_c SiO_{(4-b-c)/2} \tag{1}$$

In formula (1), $R^3$ is a substituted or unsubstituted monovalent hydrocarbon group of preferably 1 to 10 carbons which has no aliphatic unsaturated bonds and is bonded to a silicon atom. Illustrative examples of the substituted or unsubstituted monovalent hydrocarbon groups represented by $R^3$ include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; and any of these groups in which some or all of the hydrogens have been substituted with halogen atoms such as fluorine, bromine or chlorine, specific examples of which include chloromethyl, chloropropyl, bromoethyl and trifluoropropyl. The substituted or unsubstituted monovalent hydrocarbon group represented by $R^3$ is preferably an alkyl or aryl, and more preferably methyl or phenyl. The letter b is a positive number from 0.7 to 2.1, the letter c is a positive number from 0.001 to 1.0, and the sum b+c is a positive number from 0.8 to 3.0. Preferably, b is from 1.0 to 2.0, c is from 0.01 to 1.0, and b+c is from 1.5 to 2.5.

The two or more, and preferably three or more, SiH groups on the molecule may be located at the ends of the molecular chain or at intermediate positions on the chain, or they may be located both at the ends and along the chain. Although this organohydrogenpolysiloxane may have a linear, cyclic, branched or three-dimensional network structure, for the silicone rubber obtained from the inventive coating composition to have good physical properties and for the composition to be easy to handle and work with, it is advantageous to use an organohydrogenpolysiloxane in which the number of silicon atoms per molecule (degree of polymerization) is generally about 2 to 1,000, preferably about 3 to 300, and more preferably about 4 to 150; which has a viscosity at 25° C. of generally about 0.1 to 5,000 mPa·s, preferably about 0.5 to 1,000 mPa·s, and more preferably about 5 to 500 mPa·s; and which is liquid at room temperature (25° C.).

Illustrative examples of such organohydrogenpolysiloxanes that may be used as component B include methylhydrogenpolysiloxanes capped at both ends of the molecular chain with trimethylsiloxy groups, dimethylsiloxane-methylhydrogensiloxane copolymers capped at both ends of the molecular chain with trimethylsiloxy groups, dimethylsiloxane-methylhydrogensiloxane-methylphenylsiloxane copolymers capped at both ends of the molecular chain with trimethylsiloxy groups, dimethylpolysiloxanes capped at both ends of the molecular chain with dimethylhydrogensiloxy groups, dimethylsiloxane-methylhydrogensiloxane copolymers capped at both ends of the molecular chain with dimethylhydrogensiloxy groups, dimethylsiloxane-methylphenylsiloxane copolymers capped at both ends of the molecular chains with dimethylhydrogensiloxy groups, methylphenylpolysiloxanes capped at both ends of the molecular chain with dimethylhydrogensiloxy groups, organosiloxane copolymers composed of siloxane units of the formula $R^1_3SiO_{0.5}$, siloxane units of the formula $R^1_2HSiO_{0.5}$, and a small amount of siloxane units of the formula $SiO_2$, organosiloxane copolymers composed of siloxane units of the formula $R^1_2HSiO_{0.5}$ and a small amount of siloxane units of the formula $SiO_2$, organosiloxane copolymers composed of siloxane units of the formula $R^1HSiO$ and a small amount of siloxane units of the formula $R^1SiO_{1.5}$, or siloxane units of the formula $HSiO_{1.5}$, and mixtures of two or more of these organopolysiloxanes. $R^1$ in the above formulas represents substituted or unsubstituted monovalent hydrocarbon groups other than alkenyl, and is exemplified by the same groups as those mentioned above.

In the invention, it is preferable for the organohydrogenpolysiloxane used as component B to be a combination of an organohydrogenpolysiloxane capped at both ends of the molecular chain with triorganosiloxy groups (e.g., methylhydrogenpolysiloxane capped at both ends of the molecular chain with trimethylsiloxy groups) with a diorganosiloxane-organohydrogensiloxane copolymer capped at both ends of the molecular chain with triorganosiloxy groups or capped at both ends of the molecular chain with diorganohydrogensiloxy groups (e.g., dimethylsiloxane-methylhydrogensiloxane copolymers capped at both ends of the molecular chain with trimethylsiloxy groups or capped at both ends of the molecular chain with dimethylhydrogensiloxy groups). Here, "organo" does not refer to alkenyl groups.

In a first type of coating composition according to the invention which uses only an organic peroxide as the crosslinking reaction catalyst, component B is included in an amount of 0.1 to 50 parts by weight, and preferably 1 to 30 parts by weight, per 100 parts by weight of the organopolysiloxane used as component A. At less than 0.1 part by weight, a sufficient coat strength and adhesion-enhancing effect are not achieved. On the other hand, the inclusion of more than 50 parts by weight excessively diminishes the heat resistance and strength of the coat.

In a second type of coating composition according to the invention which uses both an organic peroxide and an addition reaction catalyst as the crosslinking reaction catalyst, component B is included in an amount of 1 to 7 moles, and preferably 2 to 5 moles, of silicon-bonded hydrogen atoms in component B per mole of silicon-bonded alkenyl groups in component A. At less than 1 mole of silicon-bonded hydrogen atoms in component B per mole of silicon-bonded alkenyl groups in component A, a sufficient coat strength is not achieved. On the other hand, the inclusion of more than 7 moles excessively diminishes the heat resistance and strength of the coat.

The organic peroxide reaction catalyst included as component C in the coating composition of the invention may be any organic peroxide reaction catalyst commonly used to cure silicone rubber. Specific, non-limiting, examples include benzoyl peroxide, dicumyl peroxide, t-butyl benzoate, t-butyl peroxybenzoate, di-t-butyl peroxide, t-butylcumyl peroxide, 1,1-bis(t-butylperoxy)-3,3,5-trimethylcyclohexane, 2,5-dimethyl-2,5-bis(t-butylperoxy)hexane,-1,6-bis(t-butylperoxycarboxy)hexane, di(4-methylbenzoyl) peroxide, di(2-methylbenzoyl)peroxide and t-butylperoxyisopropyl monocarbonate.

The organic peroxide reaction catalyst used as component C is included in a catalytic amount, generally about 0.1 to 20 parts by weight, preferably about 0.2 to 15 parts by weight, and most preferably about 0.5 to 10 parts by weight, per 100 parts by weight of the organopolysiloxane serving as component A. At less than 0.1 part by weight, sufficient crosslinking may not be achieved. On the other hand, the use of too much catalyst may exacerbate the effects of the organic peroxide and be wasteful in terms of cost.

An addition reaction catalyst can be used together with the organic peroxide reaction catalyst. By using two reaction systems, a good rubber strength and adhesion can be obtained. In turn, when the coating composition is used to form a coat on an airbag, the silicone rubber coat has a high strength and does not readily peel, resulting in an excellent airtightness that minimizes the leakage of inflator gas and extends the inflation time.

The addition reaction catalyst used here may be any catalyst which promotes the addition reaction between the alkenyl groups in component A and the SiH groups in component B. Illustrative examples include platinum family metals and their compounds, such as platinum, palladium, rhodium, hexachloroplatinic acid, alcohol-modified hexachloroplatinic acid, coordination compounds of hexachloroplatinic acid with olefins, vinylcyclohexane or acetylene compounds, tetrakis(triphenylphosphine)palladium and chlorotris(triphenylphosphine)rhodium. Platinum compounds are especially preferred.

The addition reaction catalyst is included in an amount, expressed as the amount of catalyst metal element based on the combined amount of components A and B, of preferably 1 to 500 ppm, and more preferably 10 to 100 ppm. At less than 1 ppm, the addition reaction becomes very slow or curing may not take place. On the other hand, at more than 500 ppm, the cured polysiloxane composition may have a diminished heat resistance.

The finely divided silica serving as component D in the invention is used as a reinforcement; that is, to impart a high tear strength to the cured form of the inventive composition. By using finely divided silica as the reinforcement, a coat can be formed which fulfills the tear strength properties required in the intended applications. This finely divided silica has a specific surface area, as measured by the BET method, of at least 50 $m^2/g$, preferably 50 to 400 $m^2/g$, and most preferably 100 to 300 $m^2/g$. At a specific surface area of less than 50 $m^2/g$, sufficient tear strength properties cannot be achieved.

In the practice of the invention, the finely divided silica may be any known silica used as a reinforcing filler for silicone rubber, provided the silica has a specific surface area within the above-indicated range. Exemplary silicas include precipitated silica, fumed silica and fired silica. Any one or combinations of two or more thereof may be used. Such finely divided silicas may be used directly without modification. However, to impart the inventive composition with good flow properties, it is advantageous to use a hydrophobic silica powder prepared by surface treating finely divided silica with, for example, a silazane such as hexamethyldisilazane, a silane coupling agent such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane; or an organosilicon compound such as polymethylsiloxane or organohydrogenpolysiloxane.

The coating composition of the invention can achieve sufficient strength even in the absence of component D, although the addition of component D is preferred. The amount of component D included is from 0 to 50 parts by weight per 100 parts by weight of the organopolysiloxane serving as component A. The use of at least 1 part by weight, and especially 1 to 30 parts by weight, is preferred. Too much component D may compromise the flow properties of the liquid composition, making the coating operation more difficult to carry out.

The purpose of the tackifier used as component E in the invention is to enhance adhesion of the coating composition to synthetic fiber woven base fabrics and nonwoven base fabrics for airbags, or to thermoplastic resin sheet or film-type base materials for airbags. To confer the coating composition with self-adhesive properties, the tackifier may be any ingredient that imparts adhesion. Preferred tackifiers include one, or combinations of two or more of the following: non-silicone type (containing no silicon atoms on the molecule) organic compounds, or organosilicon compounds or organotitanium compounds, bearing at least one type, and preferably two or more types, of functional groups.

Specific examples of functional group-bearing organosilicon compounds include organosilanes having one or more type of functional group selected from among alkenyl groups such as vinyl and allyl which are bonded to a silicon atom, epoxy groups (e.g., γ-glycidoxypropyl, β-(3,4-epoxycyclohexyl)ethyl) and (meth)acryloxy groups (e.g., γ-acryloxypropyl, γ-methacryloxypropyl) which are bonded to a silicon atom through an intervening carbon atom, alkoxy groups (e.g., methoxy, ethoxy, propoxy, butoxy), alkoxysilyl groups (e.g., alkoxysilyl groups such as trimethoxysilyl, triethoxysilyl or methyldimethoxysilyl which are bonded to a silicon atom through an alkylene group that may include one or two ester, urethane or ether structures), isocyanate groups and SiH groups; linear or cyclic siloxane oligomers having 3 to 50, and preferably 5 to 20 silicon atoms; and (alkoxy)silyl-modified triallyl isocyanurate and siloxane derivatives thereof. In the practice of the invention, it is especially preferable for the tackifier to bear at least two types of such functional groups on the molecule. Specific examples of such functional group-bearing silicon compounds include the following.

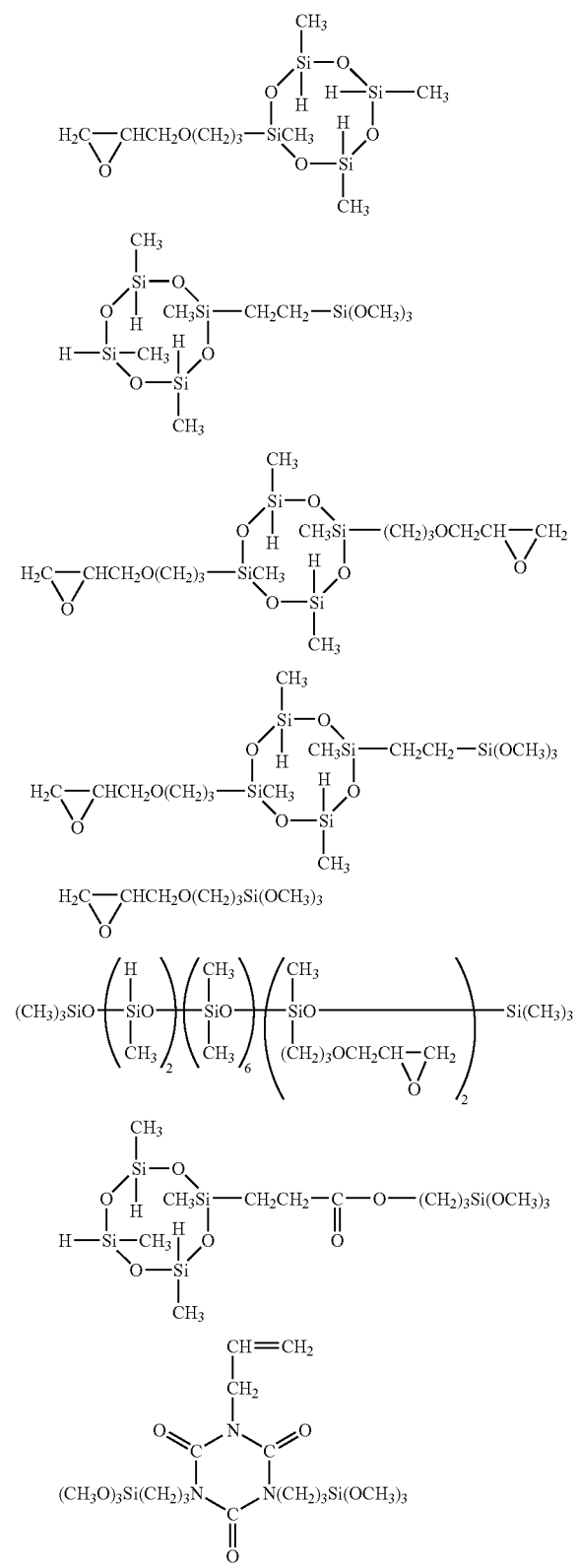

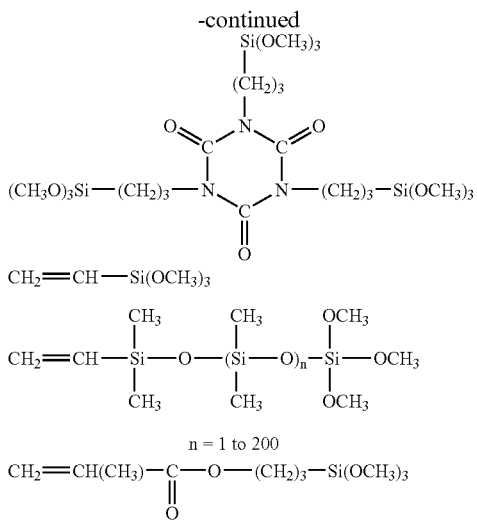

Specific examples of non-silicone type organic compounds include organic compounds having on the molecule one alkenyl group and at least one ester group, such as the following allyl esters: allyl esters of unsaturated carboxylic acids (e.g., acrylic acid, methacrylic acid, vinylacetic acid), the allyl ester of benzoic acid, the diallyl ester of phthalic acid, the tetrallyl ester of pyromellitic acid, and the allyl esters of aliphatic acids. Moreover, epoxy group ring-opening catalysts, such as organometallic chelates, amines, amides, imidazoles and acid anhydrides, may be added.

Specific examples of organotitanium compounds include tetra-i-propyl titanate, tetra-n-butyl titanate, butyl titanate dimer, tetrastearyl titanate, triethanolamine titanate, titanium acetyl acetonate, titanium ethyl acetoacetate, titanium lactate, octylene glycol titanate, isopropyltristearoyl titanate, isopropyltridodecylbenzenesulfonyl titanate, isopropyltris(dioctylpyrophosphate)titanate, bis(dioctylpyrophosphate)oxyacetate titanate, bis(dioctylpyrophosphate)ethylene titanate, tetrabutoxytitanium, tetrakis(2-ethylhexyloxy)titanium, tetrastearyloxytitanium, titanium stearate, tetraoctyloxytitanium, titanium i-propoxyoctylene glycolate, titanium ethyl acetonate and titanium lactonate, as well as condensation product oligomers and polymers thereof.

When the epoxy groups mentioned above are used as the functional groups in the above-described functional group-bearing organic compounds or organosilicon compounds, it is desirable for the compound to have an epoxy equivalent weight of 100 to 5,000 g/mol, and preferably 150 to 3,000 g/mol. An epoxy equivalent weight that is too small may give the composition an excessive viscosity, whereas one that is too large may compromise the adhesive properties of the composition.

Of the above, it is especially desirable for the tackifier used as component E in the inventive coating composition to be one or more selected from among non-silicone type organic compounds or organosilicon compounds having an epoxy equivalent weight of from 100 to 5,000 g/mol, organosilicon compounds having on the molecule at least one alkenyl or SiH group and at least one alkoxy group, organotitanium compounds having on the molecule at least 12 carbon atoms, and organosilicon compounds having on the molecule at least one nitrogen atom.

The amount of component E included in the coating composition is 0.1 to 10 parts by weight, and preferably 0.5 to 5 parts by weight, per 100 parts by weight of the organopolysiloxane of component A. Too little component E may prevent a sufficient peel strength from being achieved, whereas too much may be costly and thus uneconomical.

In addition to above components A to E, optional ingredients that may also be included in the inventive composition include inorganic fillers such as crystalline silica, hollow fillers, silsesquioxane, fumed titanium dioxide, magnesium oxide, zinc oxide, iron oxide, aluminum hydroxide, magnesium carbonate, calcium carbonate, zinc carbonate, sheet mica, carbon black, diatomaceous earth, and glass fibers; and these fillers that have been surface-treated with organosilicon compounds such as organoalkoxysilane compounds, organochlorosilane compounds, organosilazane compounds or low-molecular-weight siloxane compounds. Other ingredients that may be included in the composition include silicone rubber powders and silicone resin powders.

Insofar as the objects of the invention may be attained, the coating composition of the invention may also include as optional ingredients organopolysiloxanes having on the molecule one silicon-bonded hydrogen atom or alkenyl group and bearing no other functional groups, organopolysiloxanes having no silicon-bonded hydrogen atoms or alkenyl groups, organic solvents, creep hardening inhibitors, plasticizers, thixotropy-imparting agents, pigments, dyes and mildewproofing agents.

When the inventive coating composition is of the second type mentioned above which uses as the crosslinking reaction catalyst both an organic peroxide and an addition reaction catalyst, the composition may include as optional ingredients in addition to above components A to E any known regulator compound believed to have a cure inhibiting effect on the addition reaction catalyst. Examples of such compounds include phosphorus-bearing compounds such as triphenylphosphine, nitrogen-bearing compounds such as tributylamine, tetramethylethylenediamine and benzotriazole, sulfur-bearing compounds, acetylene compounds, compounds having two or more alkenyl groups, hydroperoxy compounds and malic acid derivatives. The extent of the cure-retarding effect achieved by the regulator compound varies considerably according to the chemical structure of the regulator compound. It is thus preferable to adjust the amount of regulator compound included in the composition so as to be optimal for the particular regulator compound being used. Generally, the addition of too little regulator compound may fail to provide long-term shelf stability at room temperature, whereas the addition of too much may impede curing.

The coating compositions described above may be prepared by simply mixing together the respective components. Alternatively, the composition may be prepared by mixing together components A and D under heat treatment, then adding and mixing together the other components at room temperature. The resulting composition is effective as a coating for textile fabrics, but is particularly useful as a coating for airbags, especially hollow-weave airbags.

The coating composition according to the invention is a liquid having a viscosity at 25° C. of usually 5 to 5,000 Pa·s, preferably 5 to 1,000 Pa·s, and more preferably 10 to 500 Pa·s. At less than 5 Pa·s, adequate rubber properties may not be achieved, whereas a viscosity of more than 5,000 Pa·s makes the composition difficult to coat.

Curing methods and conditions known to the art may be used for curing the above coating compositions. Generally, the composition can be cured at a temperature of 120 to 180° C. for a period of 1 to 10 minutes.

In the practice of the invention, it is desirable for the cured silicone rubber thus obtained to have a tear strength of at least 25 kN/m and a peel strength of at least 30 N/cm. If the tear strength is too small, cracks may form in the silicone rubber coat at seams in the airbag during inflation, which may make it impossible to ensure the desired inflation time. Moreover, if the peel strength is too low, delamination of the coat from the base fabric at seams may occur during airbag inflation, possibly preventing the inflation time from being sustained.

The tear strength is the value measured in accordance with JIS K 6249. The peel strength is the value obtained by sandwiching the coating composition to a thickness of 0.5 mm between two sheets of nylon 66 (420 denier) woven airbag fabric, curing for 1 minute at 170° C. and 5 kgf/cm$^2$, then cutting the laminate into 2.5×20 cm strips and subjecting the strips to a peel strength test at a peel angle of 180 degrees and a test rate of 50 mm/min.

The hollow-weave airbag of the invention on which a silicone rubber coat has been formed from the inventive composition may be one of a known construction. Illustrative examples include hollow-weave airbags in which the base fabric is a woven fabric made of synthetic fiber, such as nylon 66, nylon 6, polyester fiber, aramid fiber, various types of polyamide fiber and various types of polyester fiber.

A conventional method may be used to coat the inventive composition onto such a hollow-weave airbag. The amount of coating composition applied to the surface is generally about 15 to 150 g/m$^2$, preferably about 15 to 80 g/m$^2$, and most preferably about 20 to 60 g/m$^2$.

EXAMPLES

The following Examples and Comparative Examples are provided to illustrate the invention, and are not intended to limit the scope thereof. In these examples, all parts are by weight. The viscosity values were obtained at 25° C.

Tackifiers 1 to 3 below were used in the examples.

Tackifier 1:

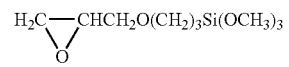

Epoxy equivalent weight, 238 g/mol

Tackifier 2:

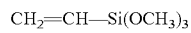

Tackifier 3:

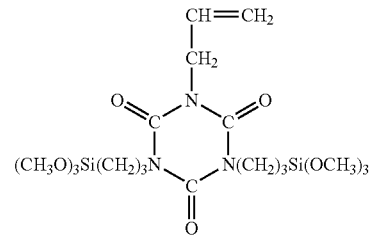

Example 1

A composition A having a viscosity of 50 Pa·s was prepared by mixing together the following ingredients: 50 parts of a dimethylpolysiloxane capped at both ends of the molecular chain with trivinylsiloxy groups and having a viscosity of 1,000 mPa·s, 40 parts of a dimethylpolysiloxane capped at both ends of the molecular chain with dimethylvinylsiloxy groups and having a viscosity of 1,000 mPa·s, 10 parts of a dimethylsiloxane-methylvinylsiloxane copolymer capped at both ends of the molecular chain with trimethylsiloxy groups, including among the diorganosiloxane units on the main chain 5 mol % of vinylmethylsiloxane units and 95 mol % of dimethylsiloxane units and having a viscosity of 2,000 mPa·s, 17 parts of a hydrophobic silica treated with trimethylsilyl groups and having a specific surface area of 120 m$^2$/g, 1.0 part of a methylhydrogenpolysiloxane (silicon-bonded hydrogen atom content, 1.45 wt %) capped at both ends of the molecular chain with trimethylsiloxy groups and having a viscosity of 50 mPa·s, 2.2 parts of a dimethylsiloxane-methylhydrogensiloxane copolymer having silicon-bonded hydrogen atoms at both ends of the molecular chain and on side chains off the molecular chain and having a viscosity of 12 mPa·s (silicon-bonded hydrogen atom content, 0.54 wt %), 5 parts of di(2-methylbenzoyl)peroxide, 3 parts of tackifier 1, and 1 part of tackifier 2.

After 5 minutes of curing at 150° C., the composition was fabricated into a sheet and the general properties were measured in accordance with JIS K 6249.

In addition, this composition was sandwiched between two sheets of nylon 66 (420 denier) woven airbag fabric to a thickness of 0.5 mm, and cured for 1 minute at 170° C. and 5 kgf/cm$^2$. The resulting laminate was cut into 2.5×20 cm strips and the strips were subjected to a peel strength test.

The silicone rubber composition was coated onto a hollow-weave airbag fabric with a coater using the minimum amount of composition necessary to achieve an even and uniform coat, and the coatability was checked. The applied composition was heated in an oven at 170° C. for 3 minutes to effect curing, thereby giving a finished hollow-weave airbag. An inflation test was carried out using the resulting airbag. In the inflation test, the airbag was instantaneously inflated by blowing in air at an air pressure of 7 kgf/cm$^2$ for 3 seconds, and the airtightness was visually examined.

The results of these tests are shown in Table 1.

Example 2

A composition B having a viscosity of 100 Pa·s was prepared by mixing together the following ingredients: 60 parts of a dimethylpolysiloxane capped at both ends of the molecular chain with trivinylsiloxy groups and having a viscosity of 5,000 mPa·s, 32 parts of a dimethylpolysiloxane capped at both ends of the molecular chain with dimethylvinylsiloxy groups and having a viscosity of 1,000 mPa·s, 3 parts of a dimethylsiloxane-methylvinylsiloxane copolymer capped at both ends of the molecular chain with trimethylsiloxy groups, including among the diorganosiloxane units on the main chain 10 mol % of vinylmethylsiloxane units and 90 mol % of dimethylsiloxane units and having a viscosity of 70 mPa·s, 5 parts of an organopolysiloxane resin composed of 39.5 mol % of $(CH_3)_3SiO_{1/2}$ units, 6.5 mol % of $(CH_3)_2(CH_2=CH)SiO_{1/2}$ units and 54 mol % of $SiO_2$ units, 22 parts of a hydrophobic silica treated with trimethylsilyl groups and having a specific surface area of 170 m$^2$/g, 1.8 parts of a methylhydrogenpolysiloxane capped at both ends of the molecular chain with trimethylsiloxy groups and having a viscosity of 45 mPa·s (silicon-bonded hydrogen content, 1.14 wt %), 5.3 parts of a dimethylsiloxane-methylhydrogensiloxane copolymer having silicon-bonded hydrogen atoms at both ends of the molecular chain and on side chains off the molecular chain and having a viscosity of 20 mPa·s (silicon-bonded hydrogen atom content, 0.54 wt %), 5 parts of di(4-methylbenzoyl)peroxide, 1 part of tackifier 1, and 0.5 part of tackifier 3.

As in Example 1, the coatability of the composition and the physical properties of the cured silicone rubber obtained therefrom were measured, and a peel strength test and an inflation test were carried out. The results are shown in Table 1.

Comparative Example 1

A composition C having a viscosity of 100 Pa·s was prepared by mixing together the following ingredients: 30 parts of a dimethylpolysiloxane capped at both ends of the molecular chain with dimethylvinylsiloxy groups and having a viscosity of 1,000 mPa·s, 33 parts of a dimethylpolysiloxane capped at both ends of the molecular chain with dimethylvinylsiloxy groups and having a viscosity of 2,000 mPa·s, 37 parts of a dimethylpolysiloxane capped at both ends of the molecular chain with dimethylvinylsiloxy groups and having a viscosity of 5,000 mPa·s, 22 parts of a hydrophobic silica treated with trimethylsilyl groups and having a specific surface area of 170 m$^2$/g, 1 part of a methylhydrogen polysiloxane (silicon-bonded hydrogen atom content, 1.14 wt %) capped at both ends of the molecular chain with trimethylsiloxy groups and having a viscosity of 45 mPa·s, 3 parts of a dimethylsiloxane-methylhydrogensiloxane copolymer having silicon-bonded hydrogen atoms at both ends of the molecular chain and on side chains off the molecular chain and having a viscosity of 12 mPa·s (silicon-bonded hydrogen atom content, 0.54 wt %), 0.06 part of 1-ethynylcyclohexanol, 15 ppm (as platinum metal with respect to combined amount of components A and B) of a complex of hexachloroplatinic acid and divinyltetramethyldisiloxane, 1.5 parts of tackifier 1, and 0.5 part of tackifier 3.

As in Example 1, the coatability of the composition and the physical properties of the cured silicone rubber obtained therefrom were measured, and a peel strength test and an inflation test were carried out. The results are shown in Table 1.

Comparative Example 2

A composition D in the form of a compound (i.e., a non-liquid mixture having no fluidity at room temperature) was prepared by mixing together the following ingredients: 70 parts of a dimethylpolysiloxane (raw rubber) capped at both ends of the molecular chain with dimethylvinylsiloxy groups and having a degree of polymerization of 10,000, 30 parts of a dimethylsiloxane-methylvinylsiloxane copolymer (raw rubber) capped at both ends of the molecular chain with trimethylsiloxy groups, including among the diorganosiloxane units on the main chain 10 mol % of vinylmethylsiloxane units and 90 mol % of dimethylsiloxane units and having a degree of polymerization of 10,000, 33 parts of a hydrophobic silica treated with trimethylsilyl groups and having a specific surface area of 170 m$^2$/g, 2.7 parts of a methylhydrogenpolysiloxane capped at both ends of the molecular chain with trimethylsiloxy groups, containing 39.5 mol % of $(CH_3)_3SiO_{1/2}$ units and having a viscosity of 45 mPa·s (silicon-bonded hydrogen atom content, 1.14 wt %), 8.3 parts of a dimethylsiloxane-methylhydrogensiloxane copolymer having silicon-bonded hydrogen atoms at both ends of the molecular chain and on side chains off the molecular chain and having a viscosity of 12 mPa·s (silicon-bonded hydrogen atom content, 0.54 wt %), 5 parts of di(2-methylbenzoyl)peroxide, 1.5 parts of tackifier 1, and 0.5 part of tackifier 2.

Because composition D obtained in Comparative Example 2 could not be applied in the above state, it was 50% diluted with toluene and prepared to a viscosity of 100 Pa·s. The coatability and the physical properties of the cured silicone rubber obtained from the resulting diluted composition were measured as in Example 1, and a peel strength test and an inflation test were carried out. The results are shown in Table 1.

hexachloroplatinic acid and divinyltetramethyldisiloxane, 5 parts of di(2-methylbenzoyl)peroxide per 100 parts of component A, 1.5 parts of tackifier 1, 0.5 part of tackifier 2, and 0.5 part of octyl titanate.

After 5 minutes of curing at 150° C., the composition was fabricated into a sheet and the general properties were measured in accordance with JIS K 6249.

In addition, this composition was sandwiched between two sheets of nylon 66 (420 denier) woven airbag fabric to a thickness of 0.5 mm, and cured for 1 minute at 170° C. and 5 kgf/cm². The resulting laminate was cut into 2.5×20 cm strips and the strips were subjected to a peel strength test.

TABLE 1

|  | Example | | Comparative Example | |
| --- | --- | --- | --- | --- |
|  | 1 Composition A | 2 Composition B | 1 Composition C | 2 Composition D |
| Hardness (Durometer A) | 35 | 45 | 34 | 44 |
| Tensile strength (MPa) | 7.0 | 7.5 | 6.0 | 6.5 |
| Shear elongation (%) | 600 | 550 | 300 | 700 |
| Tear strength (kN/m) | 35 | 37 | 25 | 21 |
| Coatability | good | good | good | poor (dilution required) |
| Peel strength test (N/cm) | 60 | 55 | 20 | 30 |
| Inflation test | silicone rubber film did not peel | silicone rubber film did not peel | silicone rubber film peeled | silicone rubber film peeled |

Example 3

A composition E having a viscosity of 45 Pa·s was prepared by mixing together the following ingredients: 50 parts of a dimethylpolysiloxane capped at both ends of the molecular chain with trivinylsiloxy groups and having a viscosity of 1,000 mPa·s, 40 parts of a dimethylpolysiloxane capped at both ends of the molecular chain with dimethylvinylsiloxy groups and having a viscosity of 1,000 mPa·s, 10 parts of a dimethylsiloxane-methylvinylsiloxane copolymer capped at both ends of the molecular chain with trimethylsiloxy groups, including among the diorganosiloxane units on the main chain 5 mol % of vinylmethylsiloxane units and 95 mol % of dimethylsiloxane units and having a viscosity of 700 mPa·s, 17 parts of a hydrophobic silica treated with trimethylsilyl groups and having a specific surface area of 120 m²/g, 1.0 part of a methylhydrogenpolysiloxane capped at both ends of the molecular chain with trimethylsiloxy groups and having a viscosity of 50 mPa·s (silicon-bonded hydrogen atom content, 1.45 wt %), 2.2 parts of a dimethylsiloxane-methylhydrogensiloxane copolymer having silicon-bonded hydrogen atoms at both ends of the molecular chain and on side chains off the molecular chain (silicon-bonded hydrogen atom content, 0.54 wt %) and having a viscosity of 25 mPa·s (H/Vi=3.9 mol/mol, wherein H/Vi here and below represents the ratio of the total moles of SiH groups in component B to the total moles of vinyl groups in the vinyl group-bearing organopolysiloxane serving as component A), 0.05 part of 1-ethynylcyclohexanol, 30 ppm (as platinum metal with respect to combined amount of components A and B) of a complex of The silicone rubber composition was coated onto a hollow-weave airbag fabric with a coater using the minimum amount of composition necessary to achieve an even and uniform coat, and the coatability was checked. The applied composition was heated in an oven at 170° C. for 1 minute to effect curing, thereby giving a finished hollow-weave airbag. An inflation test was carried out using the resulting airbag. In the inflation test, the airbag was instantaneously inflated by blowing in air at an air pressure of 7 kgf/cm² for 3 seconds, and the airtightness was visually examined.

The results of these tests are shown in Table 2.

Example 4

A composition F having a viscosity of 40 Pa·s was prepared by mixing together the following ingredients: 60 parts of a dimethylpolysiloxane capped at both ends of the molecular chain with trivinylsiloxy groups and having a viscosity of 1,000 mPa·s, 20 parts of a dimethylpolysiloxane capped at both ends of the molecular chain with dimethylvinylsiloxy groups and having a viscosity of 1,000 mPa·s, 12 parts of a dimethylpolysiloxane capped at both ends of the molecular chain with dimethylvinylsiloxy groups and having a viscosity of 700 mPa·s, 3 parts of a dimethylsiloxane-methylvinylsiloxane copolymer capped at both ends of the molecular chain with trimethylsiloxy groups, including among the diorganosiloxane units on the main chain 10 mol % of vinylmethylsiloxane units and 90 mol % of dimethylsiloxane units and having a viscosity of 500 mPa·s, 5 parts of an organopolysiloxane resin composed of 39.5 mol % of $(CH_3)_3SiO_{1/2}$ units, 6.5 mol % of $(CH_3)_2(CH_2=CH)SiO_{1/2}$ units and 54 mol % of $SiO_2$ units, 22 parts of a hydrophobic silica treated with trimethylsilyl groups and having a specific surface area of 170 m²/g, 1.8 parts of a methylhydrogenpolysiloxane capped at both ends of the molecular chain with trimethylsiloxy groups and having a viscosity of 45 mPa·s (silicon-bonded hydrogen atom content, 1.14 wt %), 5.3 parts of a dimethylsiloxane-methylhydrogensiloxane copolymer having silicon-bonded hydrogen atoms at both ends of the molecular chain and on side chains off the molecular chain (silicon-bonded hydrogen atom content, 0.54 wt %) and having a viscosity of 12 mPa·s (H/Vi=3.4 mol/mol), 0.03 part of 1-ethynylcyclohexanol, 15 ppm (as platinum metal with respect to combined amount of components A and B) of a complex of hexachloroplatinic acid and divinyltetramethyldisiloxane, 5 parts of di(4-methylbenzoyl)peroxide per 100 parts by weight of component A, 1 part of tackifier 1, 0.5 part of tackifier 3, and 0.5 part of octyl titanate.

As in Example 3, the physical properties of the cured silicone rubber obtained from the composition were measured, and a peel strength test and an inflation test were carried out. The results are shown in Table 2.

Comparative Example 3

A composition G having a viscosity of 40 Pa·s was prepared by mixing together the following ingredients: 30 parts of a dimethylpolysiloxane capped at both ends of the molecular chain with dimethylvinylsiloxy groups and having a viscosity of 1,000 mPa·s, 33 parts of a dimethylpolysiloxane capped at both ends of the molecular chain with dimethylvinylsiloxy groups and having a viscosity of 700 mPa·s, 37 parts of a dimethylpolysiloxane capped at both ends of the molecule with dimethylvinylsiloxy groups and having a viscosity of 500 mPa·s, 22 parts of a hydrophobic silica treated with trimethylsilyl groups and having a specific surface area of 170 m²/g, 1 part of a methylhydrogenpolysiloxane capped at both ends of the molecular chain with trimethylsiloxy groups and having a viscosity of 45 mPa·s (silicon-bonded hydrogen atom content, 1.14 wt %), 3 parts of a dimethylsiloxane-methylhydrogensiloxane copolymer having silicon-bonded hydrogen atoms at both ends of the molecular chain and on side chains off the molecular chain (silicon-bonded hydrogen atom content, 0.54 wt %) and having a viscosity of 25 mPa·s (H/Vi=4.1 mol/mol), 0.06 part of 1-ethynylcyclohexanol, 15 ppm (as platinum metal with respect to combined amount of components A and B) of a complex of hexachloroplatinic acid and divinyltetramethyldisiloxane, 1.5 parts of tackifier 1, 0.5 part of tackifier 3, and 0.5 part of octyl titanate.

As in Example 3, the physical properties of the cured silicone rubber obtained from the composition were measured, and a peel strength test and an inflation test were carried out. The results are shown in Table 2.

TABLE 2

|  | Example | | Comparative Example |
| --- | --- | --- | --- |
|  | 3<br>Composition E | 4<br>Composition F | 3<br>Composition G |
| Hardness (Durometer A) | 35 | 45 | 34 |
| Tensile strength (MPa) | 9.0 | 8.5 | 6.5 |
| Shear elongation (%) | 600 | 550 | 300 |
| Tear strength (kN/m) | 35 | 37 | 24 |
| Peel strength test (N/cm) | 75 | 70 | 30 |
| Inflation test | silicone rubber film did not peel | silicone rubber film did not peel | silicone rubber film peeled |

Japanese Patent Application Nos. 2003-128648 and 2003-200963 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A liquid silicone rubber coating composition comprising:
   (A) 100 parts by weight of an organopolysiloxane having on the molecule an average of at least two alkenyl groups,
   (B) 0.1 to 50 parts by weight of an organohydrogenpolysiloxane having on the molecule at least two silicon-bonded hydrogen atoms,
   (C) a catalytic amount of a crosslinking reaction catalyst comprising an organic peroxide,
   (D) 0 to 50 parts by weight of a finely divided silica having a specific surface area of at least 50 m²/g as measured by the BET method, and
   (E) 0.1 to 10 parts by weight of a tackifier,
   wherein said component (A) contains at least 1 wt %, based on the overall amount of component A, of at least one selected from amount diorganopolysiloxanes capped at both ends of the molecular chain with trialkenylsiloxy groups, diorganosiloxane-alkenylorganosiloxane copolymers capped at both ends of the molecular chain with trialkenylsiloxy groups, diorganopolysiloxanes capped at both ends of the molecular chain with dialkenylorganosiloxy groups and diorganosiloxane-alkenylorganosiloxane copolymers capped at both ends of the molecular chain with dialkenylorganosiloxy groups, which organo groups are substituted or unsubstituted alkyl, aryl or aralkyl groups.

2. The coating composition of claim 1, wherein the crosslinking reaction catalyst additionally comprises an addition reaction catalyst.

3. The coating composition of claim 1, wherein the alkenyl group-bearing organopolysiloxane of component A is a combination of a diorganopolysiloxane capped at both ends of the molecular chain with alkenyldiorganosiloxy groups, dialkenylorganosiloxy groups or trialkenylsiloxy groups and having no alkenyl groups on the main chain with a diorganosiloxane-alkenylorganosiloxane copolymer capped at both ends of the molecular chain with trialkenylsiloxy groups, dialkenylorganosiloxy groups, alkenyldiorganosiloxy groups or triorganosiloxy groups, which organo groups are substituted or unsubstituted alkyl, aryl or aralkyl groups.

4. The coating composition of claim 1, wherein the organohydrogenpolysiloxane of component B contains an organohydrogenpolysiloxane capped at both ends of the molecular chain with triorganosiloxy groups and a diorganosiloxane-organohydrogensiloxane copolymer capped at both ends of the molecular chain with triorganosiloxy groups or diorganohydrogensiloxy groups.

5. The coating composition of claim 1, wherein the tackifier of component E is at least one selected from among organic compounds or organosilicon compounds having an epoxy equivalent weight of from 100 to 5,000 g/mol, organosilicon compounds having on the molecule at least one nitrogen atom, organotitanium compounds having on the molecule at least 12 carbon atoms, and organo silicon compounds having on the molecule at least one alkenyl or SiH group and at least one alkoxy group.

6. The coating composition of claim 1 which has a viscosity at 25° C. of 5 to 5,000 Pa·s.

7. An airbag comprising in part a rubber coat made from the coating composition of claim 1.

8. An airbag comprising a bag formed by weaving, and a rubber coat which covers the woven bag and is made from the coating composition of claim 1.

9. The coating composition of claim 1, wherein the organic peroxide reaction catalyst used as component C is included in an amount of about 0.1 to 20 parts by weight per 100 parts by weight of the organopolysiloxane.

10. The coating composition of claim 1, wherein an amount of the finely divided silica of component D is from 1 to 50 parts by weight per 100 parts by weight of the organopolysiloxane.

11. The coating composition of claim 2, the addition reaction catalyst is included in an amount, expressed as an amount of catalyst metal element based on the combined amount of components A and B, of 1 to 500 ppm.

* * * * *